United States Patent
Rozman et al.

(10) Patent No.: US 8,344,544 B2
(45) Date of Patent: Jan. 1, 2013

(54) BUS-TIE SSPCS FOR DC POWER DISTRIBUTION SYSTEM

(75) Inventors: Gregory I. Rozman, Rockford, IL (US); Joshua C. Swenson, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 280 days.

(21) Appl. No.: 12/783,092

(22) Filed: May 19, 2010

(65) Prior Publication Data
US 2011/0285202 A1 Nov. 24, 2011

(51) Int. Cl.
*H02J 1/10* (2006.01)
(52) U.S. Cl. ............................................ 307/44; 307/29
(58) Field of Classification Search ................ 307/44, 307/18, 19, 23, 29
See application file for complete search history.

(56) References Cited

U.S. PATENT DOCUMENTS

| | | | |
|---|---|---|---|
| 6,246,559 B1 | 6/2001 | Sanders et al. | |
| 7,453,678 B2 | 11/2008 | Beneditz et al. | |
| 7,564,147 B2 | 7/2009 | Michalko | |
| 7,638,897 B2 * | 12/2009 | Koski et al. | 307/44 |
| 2007/0081284 A1 * | 4/2007 | McAvoy et al. | 361/62 |
| 2009/0189455 A1 * | 7/2009 | Rusan et al. | 307/82 |
| 2011/0221404 A1 * | 9/2011 | Rozman et al. | 323/234 |

OTHER PUBLICATIONS

Xiaohu Feng; Radun, A.V.; , "SiC based solid state power controller," Applied Power Electronics Conference and Exposition, 2008. APEC 2008. Twenty-Third Annual IEEE , vol., No., pp. 1855-1860, Feb. 24-28, 2008.*
Izquierdo, D.; Barrado, A.; Raga, C.; Sanz, M.; Zumel, P.; Lazaro, A.; , "Protection devices for aircraft electrical power distribution systems: a survey," Industrial Electronics, 2008. IECON 2008. 34th Annual Conference of IEEE , vol., No., pp. 903-908, Nov. 10-13, 2008.*
SemiSouth, Data Sheet of SemiSouth Normally-OFF Trench SIlicon Carbide Power JFET SJEP120R063, SemiSouth Laboratories.
Meux et al., Standardizing solid state electric distribution for a greener and cheaper aircraft, More Electric Aircraft Forum coordinated by Airbus France, 2009, Airbus.

* cited by examiner

*Primary Examiner* — Daniel Cavallari
(74) *Attorney, Agent, or Firm* — Cantor Colburn LLP

(57) ABSTRACT

A direct current (DC) power distribution system includes a first electrical distribution and power management (EDPM) unit including a first DC power source connected to a first high voltage DC bus connected to a first DC load, and a first bus-tie solid state power controller (SSPC) connected to the first HVDC bus; a second EDPM unit including a second DC power source connected to a second high voltage DC bus connected to a second DC load, and a second bus-tie SSPC being connected to the second HVDC bus; and a bus-tie connected between the first bus-tie SSPC and the second bus-tie SSPC, wherein in the event a power source failure occurs in the first EDPM unit, power flows from the second DC power source to the first HVDC bus via the second bus-tie SSPC, the bus-tie, and the first bus-tie SSPC.

10 Claims, 3 Drawing Sheets

BUS-TIE SSPCS FOR DC POWER DISTRIBUTION SYSTEM

FIELD OF INVENTION

The subject matter disclosed herein generally to the field of solid state power controllers.

DESCRIPTION OF RELATED ART

Solid State Power Controllers (SSPCs) are used in power distribution systems in, for example, the aerospace industry, as an alternative to traditional electromechanical circuit breakers. An SSPC may distribute power to and protect various electrical loads. In comparison to electromechanical devices, SSPCs provide relatively fast response time, and may eliminate arcing during turn-off transient and bouncing during turn-on transient. SSPCs also do not suffer severe degradation during repeated fault isolation in comparison with electromechanical devices. SSPCs may be relatively small in weight and size. SSPCs facilitate advanced protection and diagnostics, allowing for efficient power distribution architectures and packaging techniques.

A power distribution system comprising multiple electrical distribution and power management (EDPM) units may comprise a bus-tie connecting two high voltage DC (HVDC) buses located in different EDPM units. The bus-tie is activated during emergency mode, allowing one of the HVDC buses to power the other via the bus-tie in case of, for example, a power source failure. An electromechanical breaker may be used to open or close the bus-tie at the startup and end of emergency mode; however, the electromechanical breaker may induce unwanted resonance in the HVDC buses at startup of emergency mode.

BRIEF SUMMARY

According to one aspect of the invention, a direct current (DC) power distribution system includes a first electrical distribution and power management (EDPM) unit comprising a first DC power source, the first DC power source connected to a first high voltage DC bus connected to a first DC load, and a first bus-tie solid state power controller (SSPC), the first bus-tie SSPC being connected to the first HVDC bus; a second EDPM unit comprising a second DC power source, the second DC power source connected to a second high voltage DC bus connected to a second DC load, and a second bus-tie SSPC, the second bus-tie SSPC being connected to the second HVDC bus; and a bus-tie connected between the first bus-tie SSPC and the second bus-tie SSPC, wherein in the event a power source failure occurs in the first EDPM unit, power flows from the second DC power source to the first HVDC bus via the second bus-tie SSPC, the bus-tie, and the first bus-tie SSPC.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for bus-tie SSPCs for a DC power distribution system are provided, with exemplary embodiments being discussed below in detail. A bus-tie between two EDPMs in a DC power distribution system may be connected between two bus-tie SSPCs, improving power quality on the HVDC buses during transfer of power between the HVDC buses. The bus-tie SSPCs may operate in a soft power mode during startup of power transfer across the bus-tie, preventing unwanted resonances that may occur with an electromechanical bus-tie breaker.

Figure 1:
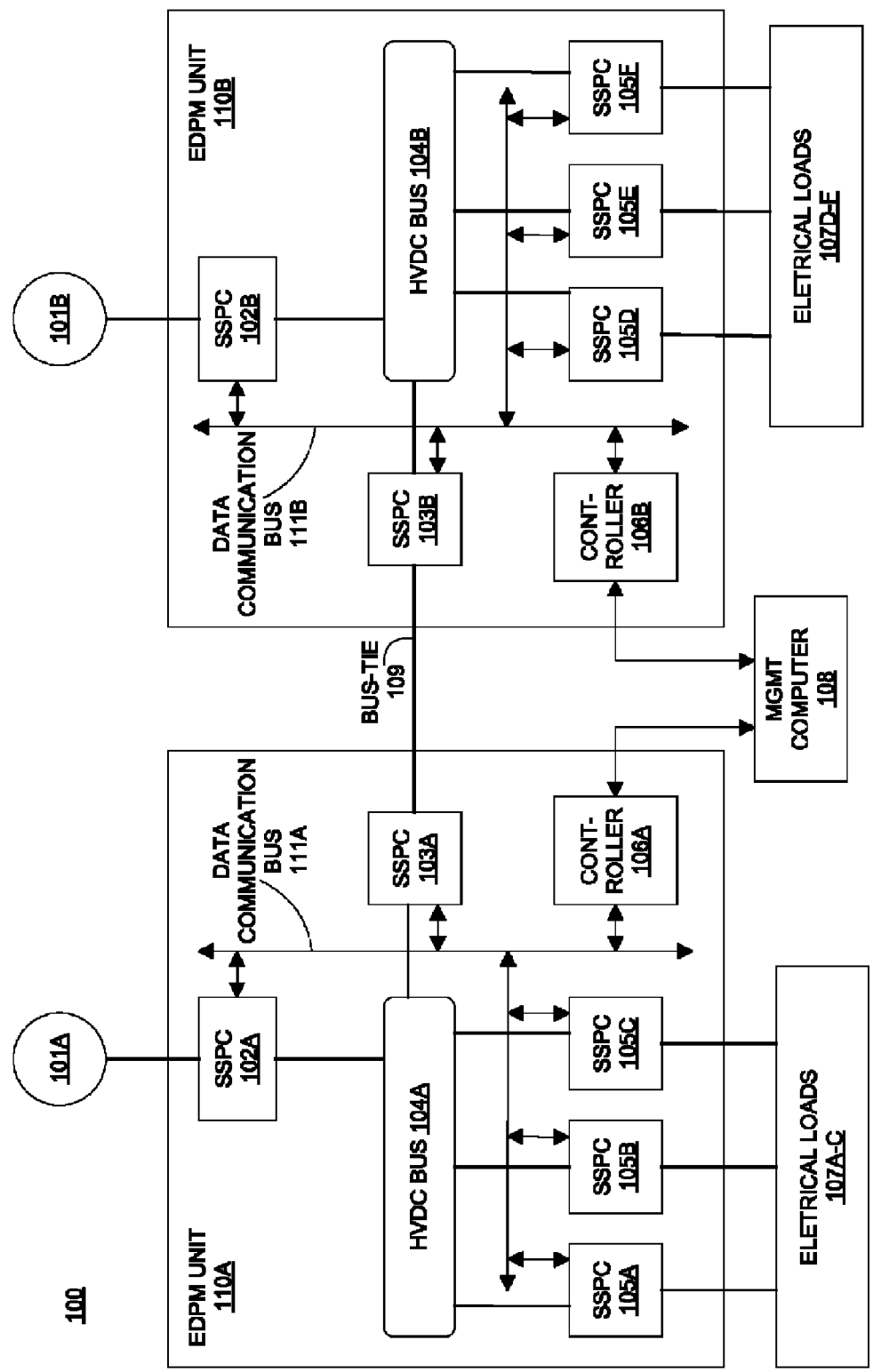
FIG. 1 illustrates an embodiment of a DC power distribution system comprising bus-tie SSPCs.

FIG. 1 illustrates an embodiment of a DC power distribution system 100, which comprises a redundant dual EDPM system consistent with fault tolerant requirements appropriate for, for example, a modern aircraft electrical system. DC power distribution system 100 comprises EDPM units 110A-B, each comprising a respective HVDC bus 104A-B. The HVDC buses 104A-B are connected by bus tie 109 via a respective bus-tie SSPC 103A-B. Each EDPM 110A-B comprises a DC power source 101A-B (which may comprise a generator in some embodiments) connected to a source management SSPC 102A-B, which supplies power to a respective HVDC bus 104A-B, respectively. HVDC bus 104A powers electrical loads 107A-C via load management SSPCs 105A-C, and HVDC bus 104B powers electrical loads 107D-F via load management SSPCs 105D-F. Management computer 108 controls EDPM controllers 106A-B, which control the respective source management SSPCs 102A-B, load management SSPCs 105A-F, and bus-tie SSPCs 103A-B via respective data communication buses 111A-B.

In normal operation, the bus-tie 109 and bus-tie SSPCs 103A-B are inactive, and no power flows between EDPMs 110A-B. DC power source 101A powers HVDC bus 104A via source management SSPC 102A, and DC power source 101B powers HVDC bus 104B via source management SSPC 102B. When the management computer 108 detects a problem with one of DC power sources 101A-B, management computer 108 activates bus-tie SSPCs 103A-B for emergency mode power transfer across bus tie 109. Emergency mode may be activated when one of HVDC buses 104A-B is disconnected from its respective DC power source 101A-B, for example, during generator or generator feeder failure in one of power sources 101A-B. Power flows across bus-tie 109 from the HVDC bus connected to the good power source to the HVDC bus connected to the bad power source, allowing the electrical loads associated with the EDPM having the bad power source to be powered by the good power source. To ensure safe power handling and transfer across bus-tie 109, a set of protection algorithms may be used (including differential fault protection between buses, isolation of the faulty power source, and bus short condition) prior to closing the bus-tie SSPCs 103A-B.

Figure 2:
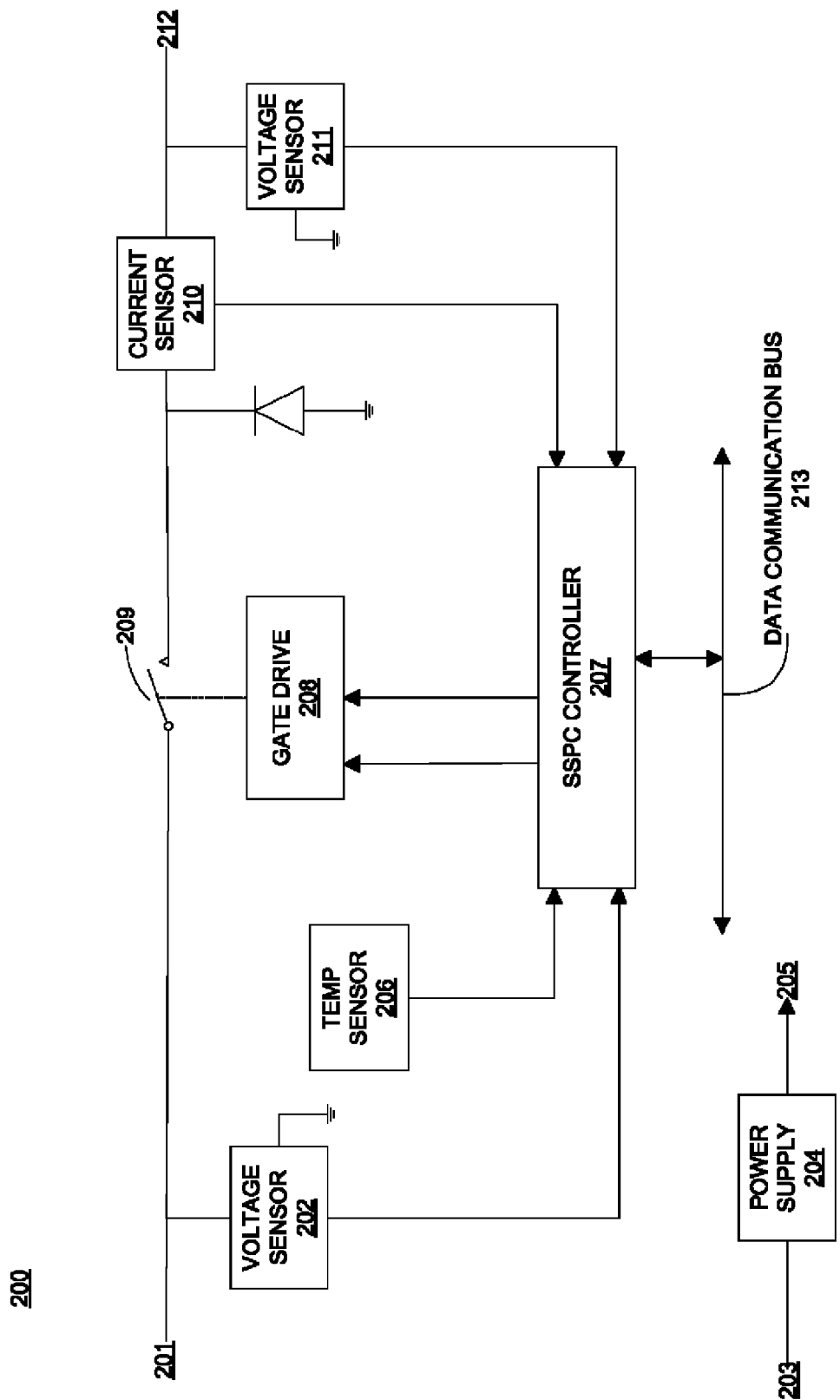
FIG. 2 illustrates an embodiment of an SSPC for a DC power distribution system.

FIG. 2 illustrates an embodiment of an SSPC 200, which may comprise any of source management SSPCs 102A-B, bus-tie SSPCs 103A-B, or load management 105A-F of FIG. 1. The SSPC 200 may be reconfigured via software that resides within SSPC controller 207 as a load management, source management, or bus-tie SSPC. For example, the SSPC controller 207 may be implemented using a programmable microcontroller, gate array, and/or other configurable circuitry. SSPC 200 comprises a bidirectional switch 209. SSPC controller 207 controls the gate-source voltage ($V_{GS}$) and On/Off commands to power switch 209 via gate drive 208 based on information from input voltage sensor 202, output voltage sensor 211, output current sensor 210, temperature sensor 206, and data communications bus 213. Data communications bus 213 receives commands from management computer 108 of FIG. 1 via the SSPC's respective EDPM controller 106A-B and data communication bus 111A-B, and sends the received commands to SSPC controller 207. The internal modules and sensors comprising SSPC 200 are powered by DC control power input 203 via internal power supply 204 and internal power supply output 205.

In embodiments in which SSPC 200 comprises a bus-tie SSPC such as SSPCs 103A-B, power may flow across SSPC 200 from connection 201 to connection 212 through switch 209, or in the opposite direction from connection 212 to connection 201 through switch 209. The direction is determined by whether power needs to be transferred from EDPM unit 110A to EDPM unit 110B, or from EDPM unit 110B to EDPM unit 110A. SSPC 200 may receive power at connection 201 from bus-tie 109 of FIG. 1, and transfer the input power to the HVDC bus 104A-B located in the SSPC's respective EDPM via power switch 209 and connection 212. The power switch 209 may comprise one or more field effect transistors (FETs) in some embodiments; the number, type, and arrangement of the FETs may vary based on the type of SSPC. Power switch 209 may comprise a set of parallel silicon carbide (SiC) junction gate FETs (JFETs) in some embodiments.

Figure 3:
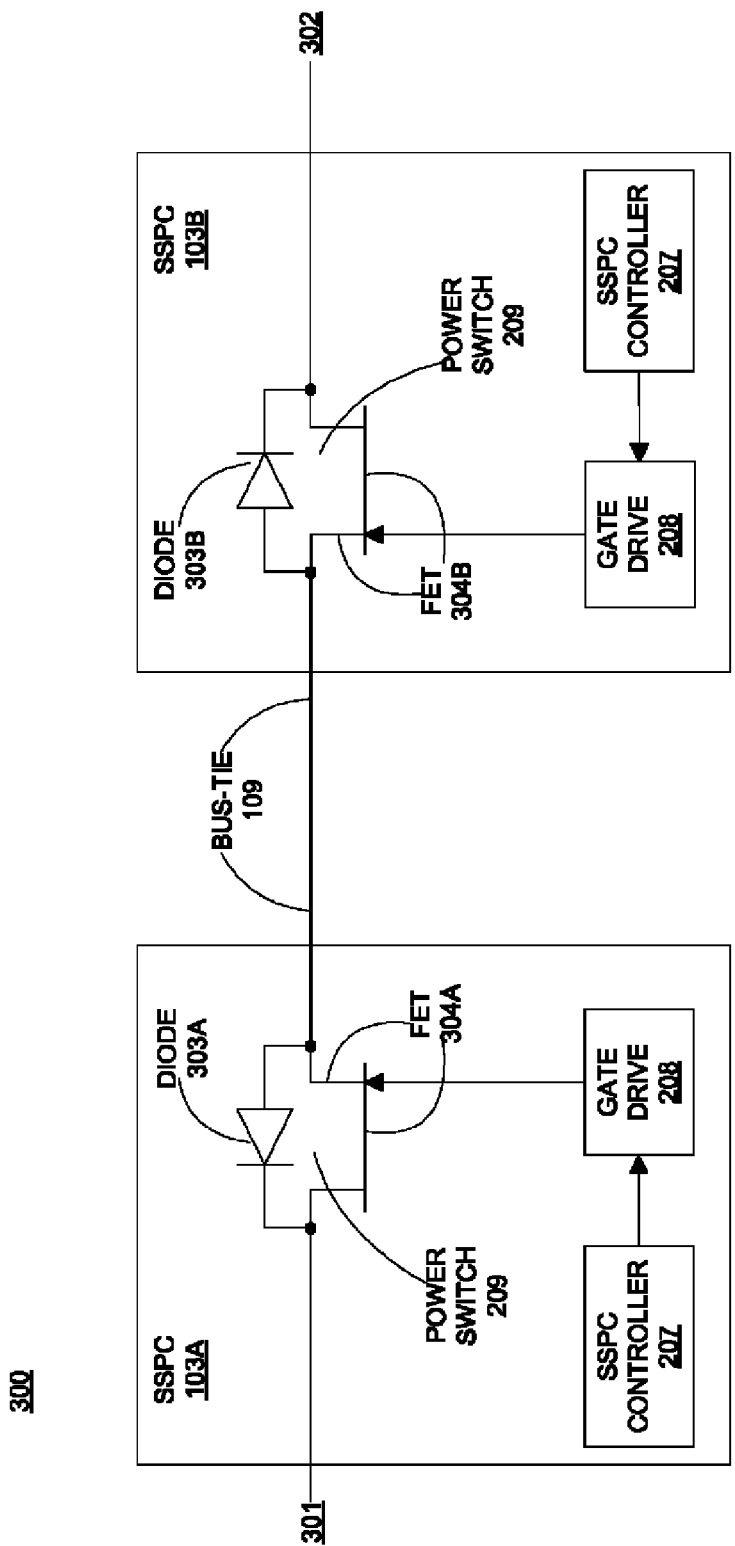
FIG. 3 illustrates an embodiment of a bus-tie connected between two bus-tie SSPCs.

FIG. 3 illustrates an embodiment of bus-tie 109 connected between bus-tie SSPCs 103A-B. Each of bus-tie SSPCs 103A-B comprise a power switch 209 controlled by an SSPC controller 207 via a gate drive 208. SSPC connection 301 of SSPC 103A is connected to HVDC bus 104A, and SSPC connection 302 of SSPC 103B is connected to HVDC bus 104B. Switches 209 in SSPCs 103A-B each comprise a respective FET 304A-B connected across a protective diode 303A-B. The protective diode 303A-B may be a Schottky diode with a low forward voltage drop and fast switching time. FETs 304A-B may comprise SiC JFETs in some embodiments. Power flow across bus-tie 109 is bidirectional; power may flow from SSPC 103A to SSPC 103B, or in the opposite direction from SSPC 103B to SSPC 103A, as needed. Use of two SSPCs 103A-B, each comprising a respective power switch 209, at either end of bus-tie 109 enables bidirectional power flow across bus-tie 109 between EDPMs 110A-B. The power flow across bus-tie 109 may also be interrupted bidirectionally by disconnecting both switches 209 in SSPCs 103A-B. This configuration allows size, weight, cost, and insertion loss reduction in the solid state bus-tie circuit breaker.

During emergency mode and transfer of power between HVDC buses 104A-B, the power switch 209 located in one or both of bus-tie SSPCs 103A-B are controlled by ramping up the $V_{GS}$ of the power switch 209 from negative bias (turn-off condition) to full on-voltage and minimum resistance (turn-on condition) within about one millisecond. Full on-voltage may comprise positive 3 volts DC in some embodiments. This allows the bus-tie SSPCs 103A-D to operate in a soft power transfer mode, resulting in significant reduction of system resonances in HVDC buses 104A-B.

The technical effects and benefits of exemplary embodiments include simplification of SSPC construction by using only one power switch per SSPC, insertion loss reduction, and reduction of system resonances during power transfer between EPDM units.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A direct current (DC) power distribution system, comprising:
    a first electrical distribution and power management (EDPM) unit comprising a first DC power source, the first DC power source connected to a first high voltage DC bus connected to a first DC load, and a first bus-tie solid state power controller (SSPC), the first bus-tie SSPC being connected to the first HVDC bus;
    a second EDPM unit comprising a second DC power source, the second DC power source connected to a second high voltage DC bus connected to a second DC load, and a second bus-tie SSPC, the second bus-tie SSPC being connected to the second HVDC bus; and
    a bus-tie connected between the first bus-tie SSPC and the second bus-tie SSPC, wherein in the event a power source failure occurs in the first EDPM unit, power flows from the second DC power source to the first HVDC bus via the second bus-tie SSPC, the bus-tie, and the first bus-tie SSPC;
    wherein the first and second bus-tie SSPCs each comprise a power switch, each power switch comprising a field effect transistor (FET) connected across a Schottky diode.

2. The DC power distribution system of claim 1, wherein in the event a power source failure occurs in the second EDPM unit, power flows from the first DC power source to the second HVDC bus via the first bus-tie SSPC, the bus-tie, and the second bus-tie SSPC.

3. The DC power distribution system of claim 1, wherein the FET comprises a silicon carbide (SiC) junction gate FET.

4. The DC power distribution system of claim 1, wherein the first and second bus-tie SSPCs each comprise a power switch, and wherein the first and second bus-tie SSPCs are configured to ramp each power switch from turn-off to turn-on within a time period of 1 millisecond in the event of a power source failure in the DC power distribution system.

5. The DC power distribution system of claim 4, further comprising turning off the power switches in the first and second bus-tie SSPCs after the power source failure is complete.

6. The DC power distribution system of claim 1, further comprising a first source management SSPC located between the first DC power source and the first HVDC bus, and a second source management SSPC located between the second DC power source and the second HVDC bus.

7. The DC power distribution system of claim 1, further comprising a first load management SSPC located between the first HVDC bus and the first DC load, and a second load management SSPC located between the second HVDC bus and the second DC load.

8. The DC power distribution system of claim 1, further comprising a management computer, the management computer being configured to control a first controller located in the first EDPM and a second controller located in the second EDPM.

9. The DC power distribution system of claim 8, wherein the first controller is configured to control a power switch located in the first bus-tie SSPC via an SSPC controller located in the first bus-tie SSPC, and the second controller is configured to control a power switch located in the second bus-tie SSPC via an SSPC controller located in the second bus-tie SSPC.

10. A direct current (DC) power distribution system, comprising:
   a first electrical distribution and power management (EDPM) unit comprising a first DC power source, the first DC power source connected to a first high voltage DC bus connected to a first DC load, and a first bus-tie solid state power controller (SSPC), the first bus-tie SSPC being connected to the first HVDC bus;
   a second EDPM unit comprising a second DC power source, the second DC power source connected to a second high voltage DC bus connected to a second DC load, and a second bus-tie SSPC, the second bus-tie SSPC being connected to the second HVDC bus; and
   a bus-tie connected between the first bus-tie SSPC and the second bus-tie SSPC, wherein in the event a power source failure occurs in the first EDPM unit, power flows from the second DC power source to the first HVDC bus via the second bus-tie SSPC, the bus-tie, and the first bus-tie SSPC;
   wherein the first and second bus-tie SSPCs each comprise a power switch, and wherein the first and second bus-tie SSPCs are configured to ramp each power switch from turn-off to turn-on within a time period of 1 millisecond in the event of a power source failure in the DC power distribution system.

* * * * *